No. 780,391. PATENTED JAN. 17, 1905.
C. B. WANAMAKER & C. B. MILES.
ROPE FORMER FOR STRAW BINDERS.
APPLICATION FILED SEPT. 14, 1903. RENEWED JUNE 25, 1904.
4 SHEETS—SHEET 1.
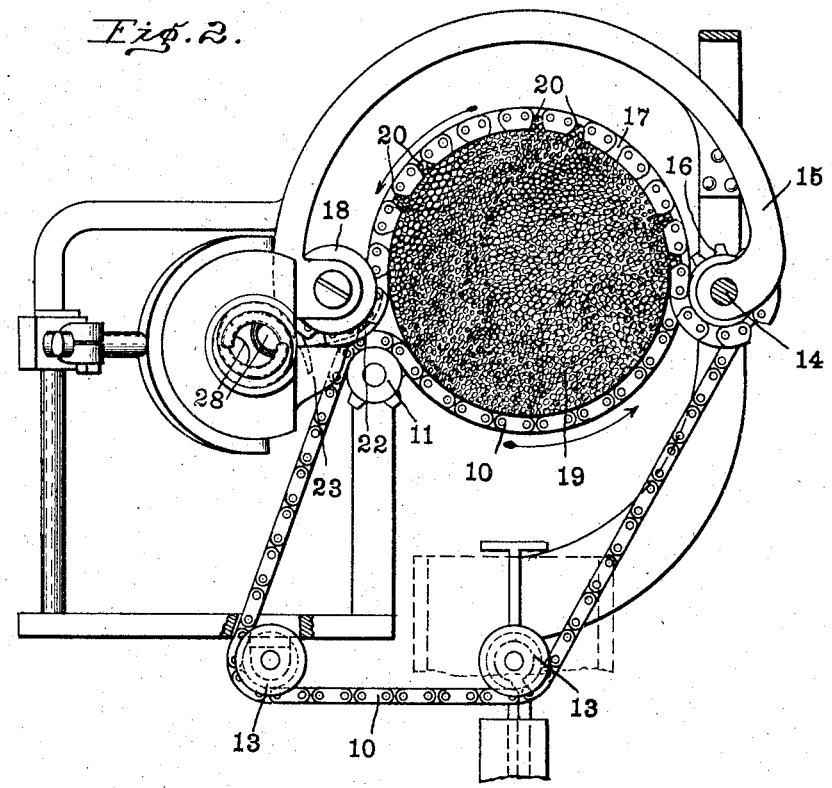
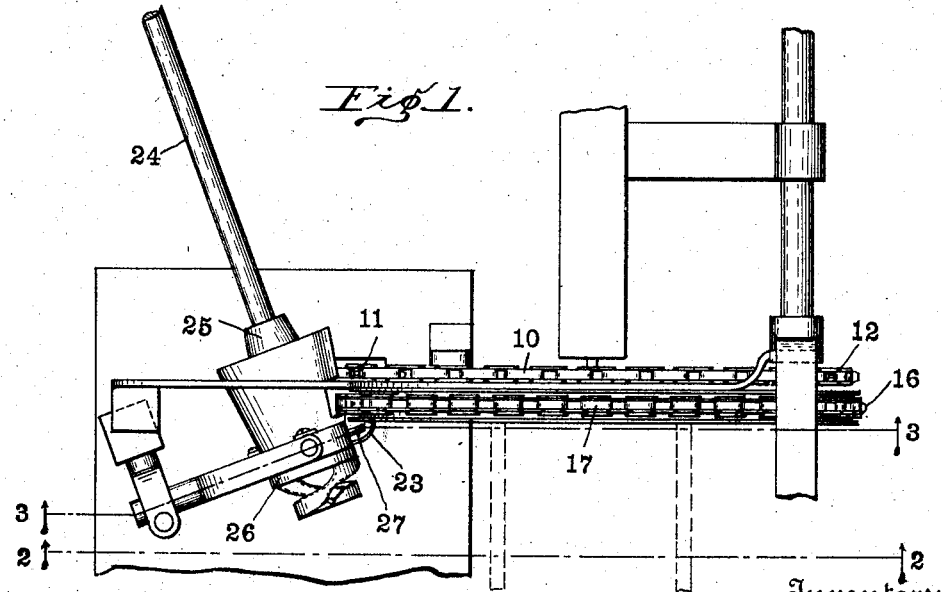
Witnesses
Frank A. Sahle
J. A. Walsh
Inventors
Charles B. Wanamaker
Clarence B. Miles
By
Bradford & Hood
Attorneys

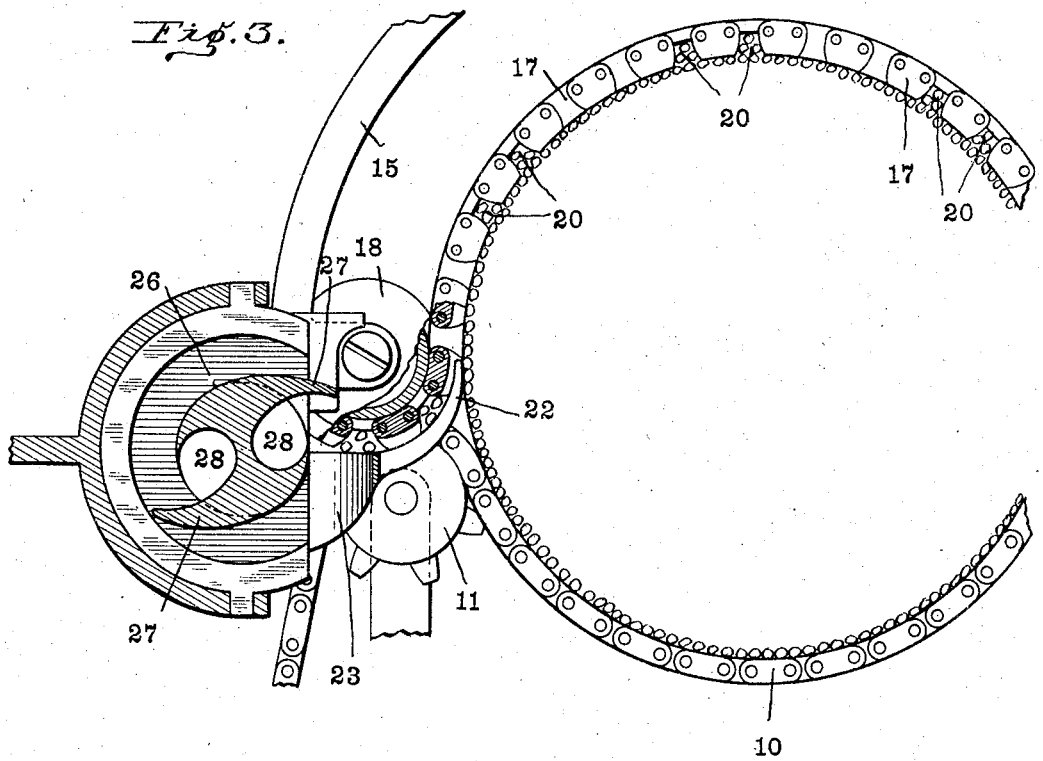
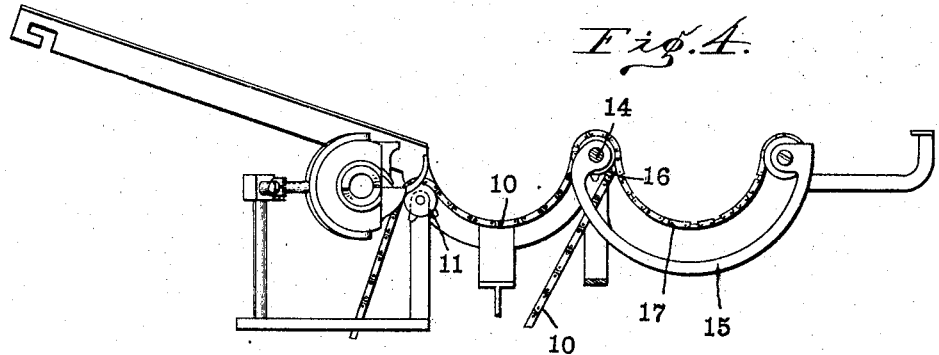

No. 780,391. PATENTED JAN. 17, 1905.
C. B. WANAMAKER & C. B. MILES.
ROPE FORMER FOR STRAW BINDERS.
APPLICATION FILED SEPT. 14, 1903. RENEWED JUNE 25, 1904.

4 SHEETS—SHEET 3.

Witnesses
Frank A. Fahle
J. A. Walsh

Inventors
Charles B. Wanamaker
Clarence B. Miles
By Bradford Hood
Attorneys

No. 780,391. PATENTED JAN. 17, 1905.
C. B. WANAMAKER & C. B. MILES.
ROPE FORMER FOR STRAW BINDERS.
APPLICATION FILED SEPT. 14, 1903. RENEWED JUNE 25, 1904.
4 SHEETS—SHEET 4.
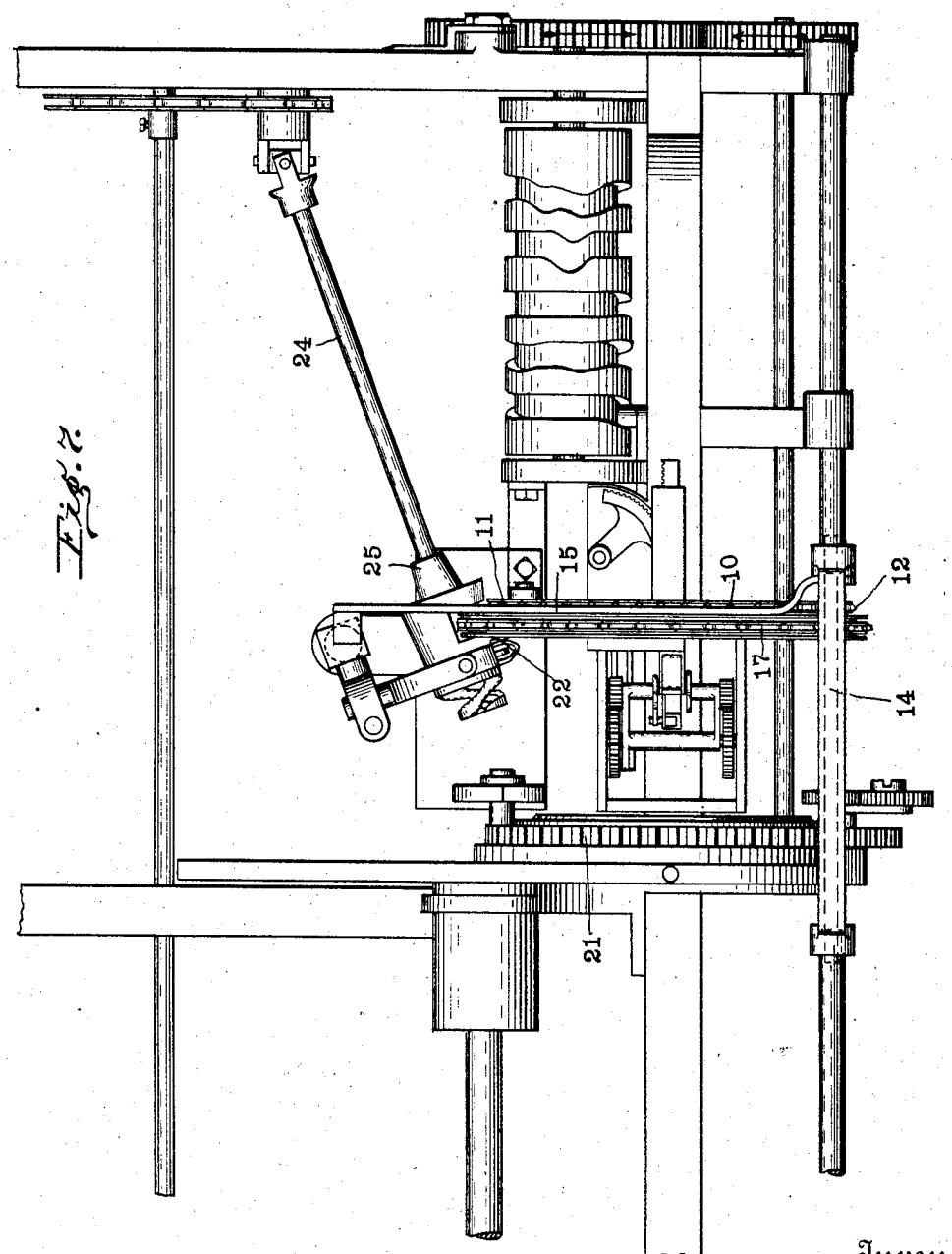
Witnesses
Frank A. Fahle
J. A. Walsh
Inventors
Charles B. Wanamaker
Clarence B. Miles
By Bradford Hood
Attorneys No. 780,391. Patented January 17, 1905.

UNITED STATES PATENT OFFICE.

CHARLES B. WANAMAKER AND CLARENCE B. MILES, OF INDIANAPOLIS, INDIANA, ASSIGNORS TO THE BROWN STRAW BINDER COMPANY, OF INDIANAPOLIS, INDIANA, A CORPORATION OF INDIANA.

ROPE-FORMER FOR STRAW BUNDLES.

SPECIFICATION forming part of Letters Patent No. 780,391, dated January 17, 1905.

Application filed September 14, 1903. Renewed June 25, 1904. Serial No. 214,129.

*To all whom it may concern:*

Be it known that we, CHARLES B. WANAMAKER and CLARENCE B. MILES, citizens of the United States, residing at Indianapolis, in the county of Marion and State of Indiana, have invented certain new and useful Improvements in Rope-Formers for Straw Bundles, of which the following is a specification.

The object of our invention is to provide an apparatus for producing from the butt-ends of an external layer of straw in a bundle an encircling band or rope by means of which the bundle may be held together, said rope being formed in a general manner like that shown in Patent No. 553,203 and preferably secured around the bundle in the manner described and claimed in our pending application Serial No. 173,217.

The accompanying drawings illustrate our invention.

Figure 5:
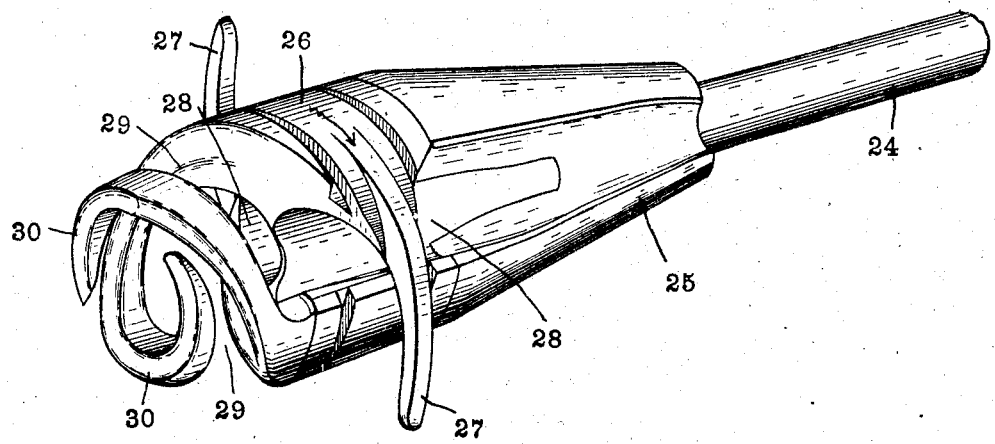
Figure 6:
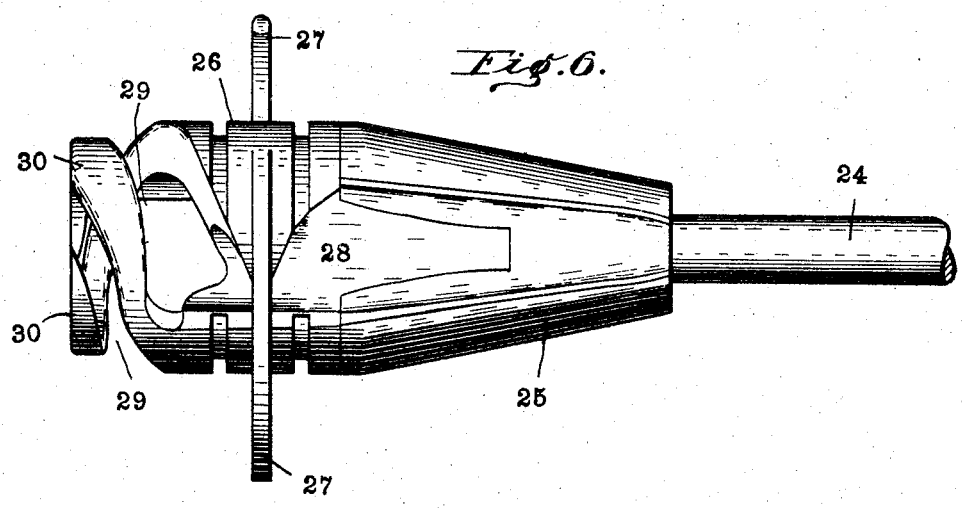

Figure 1 is a plan; Fig. 2, a sectional elevation on line 2 2 of Fig. 1; Fig. 3, a section on line 3 3 of Fig. 1 on an enlarged scale; Fig. 4, a view similar to Fig. 2, but on a smaller scale, showing the parts in straw-receiving position; Fig. 5, a perspective view of the twister-head; Fig. 6, a side elevation, and Fig. 7 a plan, of the twister and adjacent mechanism.

The bundle of grain is formed within a suitable rotating means—such, for instance, as that shown in the patent above referred to or any other suitable supporting means. The butt-end of the bundle is supported, preferably upon its lower side, by the slack of a belt 10, which extends between a pair of suitable supporting-sprockets 11 and 12 and is also carried around suitable idlers 13. Sprocket 12 is carried upon a suitable driving-shaft 14, by means of which the chain may be moved in the direction indicated by the arrows. Pivoted upon shaft 14 is a frame 15, within which the shaft 14 carries a sprocket 16, which is slightly larger in diameter than the sprocket 12. Running over sprocket 16 and supported in frame 15 is a gathering-chain 17, supported at its opposite side in frame 15 by a suitable idler 18. Chain 17 is provided at intervals in its length upon that face which comes adjacent the bundle 19 with straw-receiving transverse recesses 20, in which one or more straws may become embedded as the bundle is clasped between the belts 17 and 10.

In view of the fact that sprocket-wheel 16 is larger than wheel 12 belt 17 moves at a slightly-greater speed than belt 10. The bundle, however, is rotated by the driving-head 21 from other suitable means at the same peripheral speed as is given belt 10, and the consequence is that belt 17 is dragged over the upper surface of the rotating bundle, so that those straws which are enmeshed in the recesses 20 have their butt-ends dragged slightly ahead, and as the belt 17 passes around idler 18 these enmeshed straws are carried over or on top of a separating-finger 22, which projects bundleward from the stationary support 23. Journaled in support 23 is the twister. (Shown in Figs. 5 and 6.) This twister consists of a main driving-shaft 24, provided with a tapered head 25, the cylindrical outer end 26 of which forms the journal for the head in the support 23. Projecting tangentially from the portion 26 are two diametrically-opposed gathering-fingers 27, which fingers upon the rotation of the head 25 are arranged to engage the enmeshed butt-ends of the straws which lie in the notches 20 and draw the same into the adjacent longitudinal peripheral grooves 28, formed in head 25, the arrangement being such that the butt-ends of these straws which are gathered from the periphery of the bundle are drawn from the bundle and laid axially along shaft 24 in the grooves 28. As the twister-head rotates in the direction indicated by the arrow in Fig. 5 the bundle or head ends of these straws are carried in the spiral grooves 29, which are formed by the spiral fingers 30 30, one of which lies adjacent the forward end of each of the grooves 28, these fingers thus supporting the twisted rope back of the point of twisting, so that the finished rope may be led away from the twister at an angle to the axis of twisting. This band is tied about the bundle in any suitable manner—as, for instance, by the means shown and claimed in our pending application Serial No. 173,217.

We claim as our invention—

1. A twister consisting of a rotating head having a pair of separate longitudinal peripheral grooves, a helical twisting-finger at the end of each of said grooves, and means for laying material to be twisted in said grooves.

2. A twister consisting of a rotating head having a pair of longitudinal peripheral grooves formed therein, a pair of coacting helical fingers one at one end of each of said grooves, and a pair of tangential gathering-fingers one adjacent each of said grooves, for the purpose set forth.

3. In a machine of the class described, the combination, of a rotatable twister-head having a pair of separate longitudinal peripheral grooves, a helical finger at one end of each of said grooves, a tangential finger arranged adjacent said grooves, means for rotating the bundle, and means for successively withdrawing straw from the periphery of said bundle into the path of said finger.

4. In a machine of the class described, the combination with means for rotating a bundle, of an endless belt adapted to engage the periphery of said bundle and having straw-receiving transverse recesses formed therein, and means for separating the enmeshed straws in said recesses from the bundle.

5. In a machine of the class described, the combination, with a rotatable twister-head having a pair of separate longitudinal peripheral grooves, a helical finger at one end of each of said grooves, and a tangential finger adjacent each groove, of a gathering-finger leading to the path of movement of said grooves, a belt arranged to embrace the bundle and having transverse straw-receiving grooves, and means for guiding and moving said belt to deliver the enmeshed straws to the receiving-finger.

6. In a machine of the class described, a straw-picker consisting of a belt having transverse straw-receiving grooves, and means for supporting said belt to embrace the bundle.

7. In a machine of the class described, the combination with means for supporting and rotating a bundle, of a belt having transverse straw-receiving grooves, a swinging frame arranged to embrace the bundle, and means carried by said frame for supporting said belt whereby the belt may be caused to embrace the bundle and be swung therefrom, for the purpose set forth.

8. In a machine of the class described, the combination with a rotating twister-head having a pair of separate longitudinal peripheral grooves, a helical finger at one end of each of said grooves, and a tangential gathering-finger adjacent each groove, of a support for said head, a gathering-finger carried thereby and leading to the path of movement of said grooves, and means for bringing straws over said gathering-finger from the periphery of a bundle.

9. In a machine of the class described, the combination with bundle-rotating mechanism, and twisting mechanism, of a straw-picker consisting of a belt having transverse straw-encircling grooves, means for causing said belt to embrace the bundle, means for moving said belt at a speed different from that of the periphery of the bundle, and means for delivering the enmeshed straw to the twister.

10. In a machine of the class described, the combination with a rotatable head having a pair of separate longitudinal peripheral grooves, and a pair of tangential gathering-fingers one adjacent each groove, of a support within which the head is journaled, and a separating-finger extending bundleward from the path of movement of said grooves.

In witness whereof we have hereunto set our hands and seals, at Indianapolis, Indiana, this 8th day of September, A. D. 1903.

CHARLES B. WANAMAKER. [L. S.]
  CLARENCE B. MILES. [L. S.]

Witnesses:
  ARTHUR M. HOOD,
  JAMES A. WALSH.